(12) United States Patent
Ueki et al.

(10) Patent No.: US 6,309,107 B1
(45) Date of Patent: Oct. 30, 2001

(54) LINEAR MOTION GUIDE UNIT

(75) Inventors: Hiroshi Ueki, Tokyo; Katsuaki Nakano, Gifu-ken, both of (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/537,217

(22) Filed: Mar. 29, 2000

(30) Foreign Application Priority Data

Jun. 24, 1999 (JP) .................................................. 11-177708

(51) Int. Cl.$^7$ ...................................................... F16C 29/06
(52) U.S. Cl. ................................................................ 384/45
(58) Field of Search ............................... 384/45, 44, 43, 384/49

(56) References Cited

U.S. PATENT DOCUMENTS

| | | | |
|---|---|---|---|
| 4,806,022 | * | 2/1989 | Takahiro .................................. 384/45 |
| 5,172,982 | * | 12/1992 | Komiya .................................... 384/45 |
| 5,273,364 | * | 12/1993 | Hara ...................................... 384/45 X |
| 5,345,832 | * | 9/1994 | Takei ...................................... 384/43 X |
| 5,575,565 | * | 11/1996 | Takei et al. ............................. 384/45 |

FOREIGN PATENT DOCUMENTS

| | | |
|---|---|---|
| 0 217 971 | 4/1987 | (EP) . |
| 0 417 304 | 3/1991 | (EP) . |
| 0 707 922 | 4/1996 | (EP) . |
| 193637/1988 | 12/1988 | (JP) . |
| 298446/1990 | 12/1990 | (JP) . |
| 347009/1992 | 12/1992 | (JP) . |

* cited by examiner

Primary Examiner—Thomas R. Hannon
(74) Attorney, Agent, or Firm—Browdy and Neimark (57) ABSTRACT

A linear motion guide unit is disclosed, in which a track rail and a slider have respectively reference surfaces that serve to locate accurately them with respect to a bed and a table, thereby keeping the track rail and slider against dislocation as well as changes in posture. The track rail is mounted to the bed, with a reference side surface for mounting and a reference bottom surface for mounting of the track rail being brought into abutment against a mounting side surface and a mounting top surface of the bed, respectively. The slider is mounted to the table, with a reference side surface for mounting and a reference top surface for mounting of the slider being brought into abutment against a mounting side surface and a mounting lower surface of the table, respectively.

12 Claims, 6 Drawing Sheets

LINEAR MOTION GUIDE UNIT

BACKGROUND OF THE INVENTION

1. Field of the Invention

The present invention relates to a linear motion guide unit having wide application in sliding parts incorporated in, for example, machine tools, assembling machines, testing machines and the like. More particularly, it relates to a mounting construction of a linear motion guide unit in which a slider is movable lengthwise along a track rail.

2. Description of the Prior Art

Conventionally, the linear motion guide units have been known for fundamental means applicable universally in various technical fields. Although the linear motion guide units have been now employed extensively in machinery in various fields such as machine tools, semiconductor manufacturing apparatus, testing instruments, industrial robots and the like, the expansion of uses according to the recently remarkable development in technologies requires more and more such linear motion guide unit to deal with the precision, high-speed moving, easy assemblage, wide applicability and the like.

Figure 8:
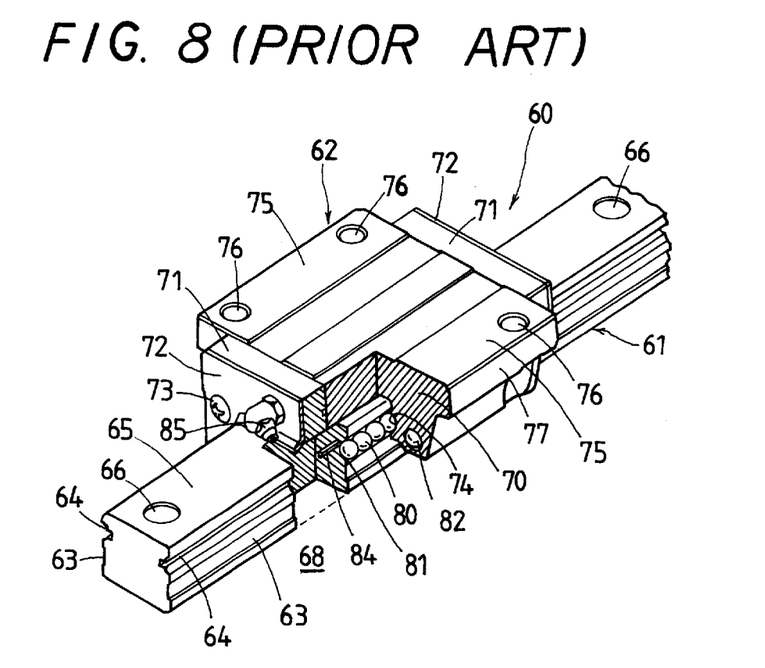
FIG. 8 is a perspective view, partially broken away, showing a prior linear motion guide unit.
Figure 9:
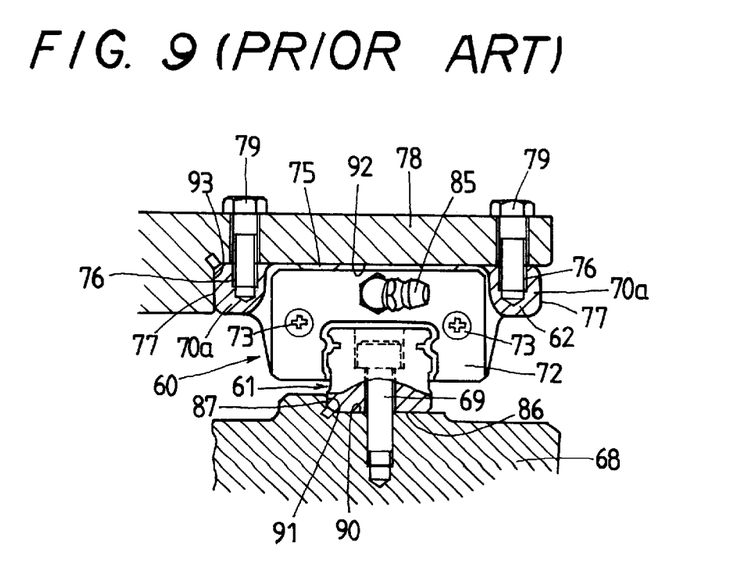
FIG. 9 is a front elevation, partially in section and partially broken away, illustrating a mounting construction of the prior linear motion guide unit to the bed and worktable.

The linear motion guide unit 60 is in general applied between members, as between a stationary bed and a workpiece table as shown in FIGS. 8 and 9, which are movable relatively to each other. The linear motion guide unit 60 is comprised of a track rail 61 having a pair of lengthwise side surfaces 63 on which are formed raceway grooves 64, and a slider 62 mounted on the track rail 61 for sliding movement along the track rail 61. The track rail 61 is made on the top surface thereof with holes 66 for bolts or screws to fix the track rail 61 to the bed 68.

The slider 62 mainly comprises a casing 70 riding astride the top surface 65 of the track rail 62, end caps 71 attached in abutment against lengthwise opposing ends of the casing 70, each to each end, and end seals 72 arranged on the end caps 71 to seal clearances between the confronting track rail 61 and end caps 71. Both the end caps 71 and end seals 72 are secured to the casing 70 by means of machine screws 73. Bottom seals, not shown, are arranged beneath both the end caps 71 and end seals 72. The casing 70 is provided with raceway grooves 74 confronting the raceway grooves 64 on the track rail 61, and holes 76 bored through a top face 75, into which fit machine screws to mount the casing 70 to the workpiece table 78.

The slider 62 is allowed to move in a sliding manner along the track rail 61 by virtue of rolling elements 81 such as balls, which run through the load areas of raceways 81 defined between the raceway grooves 64 formed on the track rail 61 and the raceway grooves 74 formed in the casing 70. The rolling elements 80 are held in the casing 70 by retainer bands 84 so as to be kept against disassembling even when the slider 62 is separated from the track rail 61. The rolling elements 80 may run through endless circulating paths composed of the load raceways 81, return tunnels 82 bored in the casing 70 to provide non-loaded passages to allow the rolling elements to circulate, and non-loaded turnarounds, not shown, formed in the end caps 71 to interconnect the loaded raceways 81 with their associated non-loaded passages. Moreover, grease nipples 85 to supply lubricant to the endless circulating paths are attached to the end caps 71 and extend outwardly of the end seals 72.

As shown in FIG. 9, the track rail 61 is mounted to the stationary bed 68 by means of bolts 69 that fit into holes 66 in the track rail 61, which is set in place where a bottom surface 86 of the track rail 61 comes in abutment against a seat surface 90 of the bed 68 while the lower area of any one lengthwise side surface 63 comes in abutment against the confronting side edge 91 of the bed 68. In contrast, the slider 62 is attached to a workpiece table 78 with bolts 79 that fit in matching holes 76 in the casing 70. The slider 62 is kept in place with the top face 75 and any one side face 77 thereof being brought into abutment against their confronting bottom surface 92 and a side surface 93 of the workpiece table 78, respectively. In this manner, the side surfaces 77 of the slider 62 are formed on laterally bulged portions 70a to provide sidewise reference surfaces for attachment to the table 78.

Moreover, another prior linear motion guide unit is disclosed in Japanese Patent Laid-Open No. 347009/1992, which comprises a track rail anchored at lengthwise opposing ends thereof, an upper sliding unit riding astride the track rail, and a lower sliding unit depending from the track rail whereby both the upper and lower sliding units are constituted for a linear motion along the track rail.

In addition, Japanese Utility Model Laid-Open No. 193637/1988 discloses linear motion guide means in which a ball-screw drive is combined integrally with a linear guide. Such prior linear motion guide means integral with the ball-screw drive has a tetragon nut mating with a ball-screw drive, a guide rail made with recessed guiding ways where the tetragon nut comes in loose engagement for linear movement along the guide rail, so that rotating the ball screw allows the tetragon nut to move linearly on the guiding ways of the guide rail by virtue of balls that may run through raceways defined between raceway grooves formed on the widthwise opposing side surfaces of the tetragon nut and raceway grooves formed in the guide rail. The linear motion guide means constructed as described just above is plagued with that the tetragon nut occupies a considerable height above the top level of the guide rail.

Disclosed in Japanese Patent Laid-Open No. 298446/1990 is a worktable traveler in which a worktable is supported for linear movement in a guide rail of U-shape in cross section. The worktable is arranged interposed between widthwise opposing inside walls through rolling elements that are allowed to run through raceways of two rows arranged in vertical juxtaposition, which are defined between confronting raceway grooves formed on the side surfaces of the work table and the inside walls of the guide rail. A screw shaft fits in matching hole that is bored in the worktable at a horizontal plane corresponding substantially center lines of vertical distances spanning between the two raceways vertically juxtaposed on the widthwise opposing side surfaces of the worktable. The guide rail is integrally molded so as to provide raceways in which the rolling elements are held in outwardly-opening contact with the confronting raceway grooves of the worktable and the guide rail, that is, phantom lines linking two points of rolling contact of any rolling element with the confronting raceway grooves of the worktable and the guide rail converge towards the center axis of the screw shaft. As an alternative, the guide rail may be made so as to provide another type of raceways in which the rolling elements are held in inwardly-opening contact, where the phantom lines diverge towards the center axis of the screw shaft.

In the prior linear motion guide unit of the type explained above in which the slider of a nut is driven to move linearly in a lengthwise recess in the guide rail by rotating the ball screw, the worktable is mounted to the flat outer surface of the slider with bolts screwed into their matching holes. Nevertheless, it is common that there is provided no reference means for mounting the worktable onto the slider.

For the linear motion guide unit compact in construction in which the slider is moved linearly in the lengthwise recess in the track rail, thus, it has been desirable to mount the worktable to the slider or mount the stationary bed to the track rail at a preselected mounting position and posture and further ensure the mounting position and posture even after a prolonged period of use.

SUMMARY OF THE INVENTION

The present invention, therefore, has as its primary object to overcome the problem as described just above and more particular to provide an improved linear motion guide unit in which a track rail and a slider, on their mounting to a stationary bed and a worktable, respectively, is controlled exactly in mounting position and posture under favor of reference surfaces for mounting, whereby the bed and worktable are kept at the desired posture with accuracy, though the worktable moves together with the slider along the track rail. This makes it possible to hold the work at its preselected position and posture, which are desirable on processing and conveying the work in any of semiconductor manufacturing machines, testing instruments, measuring appliances, processing machines, machine tools, industrial robots and the others.

The present invention is concerned with a linear motion guide unit, comprising a track rail to be mounted to a bed and having a pair of lengthwise side walls connected with each other, and a slider to be mounted to a table movable relatively to the bed so as to move lengthwise along the track rail in a guiding way defined between the side walls of the track rail, wherein the slider has a slider head not more than the guiding way in width and protruding above top faces of the side walls, the track rail is provided with a first reference surface for mounting, against which a mounting surface formed on the bed comes in abutment, and the slider head is provided with a second reference surface for mounting, against which a mounting surface formed on the table comes in abutment.

In accordance with one aspect of the present invention, the slider has a slider head protruding above the top faces of the side walls of the track rail. The track rail is mounted to the bed, with the first reference surface for mounting formed on the track rail being located in abutment against the mounting surface formed on the bed. In contrast, the slider is mounted to the table, with the second reference surface for mounting formed on the slider head being located in abutment against the mounting surface formed on the table. According to the construction described above, the table and the bed may be kept at the preselected relative location and posture, except the location in the direction of movement, even after a prolonged period of operation.

In accordance with another aspect of the present invention, the first reference surface for mounting is composed of a reference side surface formed on at least any one of the side walls of the track rail so as to extend in parallel with a lengthwise direction of the track rail, and a reference bottom surface formed on a bottom of the track rail so as to extend in parallel with the lengthwise direction of the track rail. Thus, the track rail is located accurately with respect to the mounting surfaces of the bed by virtue of two reference surfaces for mounting, that is, the reference side surface and the reference bottom surface, and mounted to the bed at the located condition.

In accordance with a further another aspect of the present invention, the mounting surface formed on the bed is composed of a mounting side surface and a mounting top surface formed on the bed. The track rail is thus located with respect to the bed, with the reference side surface and the reference bottom surface being brought into abutment against the mounting side surface and the mounting top surface, respectively.

In accordance with another aspect of the present invention, the track rail has a bottom interconnecting the widthwise opposing side walls with each other to define a recess of U-shape in cross section of the track rail, thereby providing the guiding way along which the slider moves in a sliding manner. That is to say, the track rail has the recess of U-shape in cross section constituted by side walls that is connected by the bottom with each other. The slider is allowed to run through in the recess of U-shape in cross section of the track rail.

In accordance with another aspect of the present invention, the track rail is made at the bottom thereof with holes in which fixing bolts fit to mount the track rail to the bed. Thus, the track rail is fixed to the bed at its located condition by means of the fixing bolts, which are screwed into the bed after fitting in the holes bored in the bottom of the track rail.

In accordance with another aspect of the present invention, the second reference surface for mounting is composed of a reference side surface formed on at least any one of the sidewise opposing side surfaces of the slider so as to extend in parallel with a moving direction of the slider, and a reference top surface formed on a top surface of the slider so as to extend in parallel with the moving direction of the slider.

In accordance with a further another aspect of the present invention, the mounting surface formed on the table is composed of a mounting side surface and a mounting lower surface, and the slider is located with respect to the table, with the reference side surface and the reference top surface being brought into abutment against the mounting side surface and the mounting lower surface, respectively. Thus, the slider is located accurately with respect to the mounting surfaces of the table by virtue of two reference surfaces for mounting, that is, the reference side surface and the reference lower surface, and mounted to the table at the located condition.

In accordance with another aspect of the present invention, the slider head is made with threaded holes into which fixing bolts are screwed through the table to mount the slider to the table. Moreover, the reference side surface provided on the track rail and the reference side surface provided on the slider are arranged in parallel with each other and in sidewise opposition to each other with respect to the slider. Thus, as the forces exerted on the reference side surface on the track rail and the reference side surface on the slider are compensated each other, a moment will be reduced, which might otherwise tilt the linear motion guide unit.

In accordance with another aspect of the present invention, the slider head protrudes above top faces of the side walls of the track rail by an amount of distance in a range of from 5 mm to 10 mm. The reference side surface formed on the slider is limited within the amount of distance protruded, and provides a surface to be abutted over the substantially entire area thereof against the mounting surface formed on the table. As the protrusion of the slider head is small in the distance protruding above the side walls of the track rail, the linear motion guide unit may be made compact in construction. The reference side surface ranging in depth from 5 mm to 10 mm is sufficient to help ensure the accurate location of the slider with respect to the table, irrespective of the scale of the slider.

In accordance with a further another aspect of the present invention, the slider is movable in a sliding manner along the track rail through rolling elements, which run through raceways defined between first and second raceway grooves confronting one another, the first raceway grooves being formed on widthwise opposing inside surfaces of the side walls of the track rail, and the second raceway grooves being formed on the slider in confrontation with the first raceway grooves. Moreover, the slider is comprised of a casing made with the second raceway grooves, end caps arranged on lengthwise opposing ends of the casing, each to each end, and end seals arranged on the end caps.

In the mounting construction of the linear motion guide unit described just above, the slider is mounted to the table, with the second reference surface formed on the slider head protruding above the top faces of the side walls of the track rail being located accurately in abutment relation against the mounting surface formed on the table. On the other hand, the track rail is mounted to bed, with the first reference surface on the track rail being located in abutment relation to the mounting surface formed on the bed. Thus, the table and the bed may be maintained at the preselected relative location and posture even after a prolonged period of operation.

This makes it possible to continue keeping the work at its preselected position and posture, which are desirable on processing and conveying the work in any of semiconductor manufacturing machines, testing instruments, measuring appliances, processing machines, assembling machines and the others.

DETAILED DESCRIPTION OF THE PREFERRED EMBODIMENTS

A preferred embodiment of a linear motion guide unit according to the present invention will be explained hereinafter in detail with reference to the accompanying drawings. The phraseology or terminology concerning relative locations, such as "top face", "top surface", "bottom surface", "lower surface" etc., employed hereinafter is described on the assumption that the linear motion guide unit is used in the normal posture. It is to be thus understood that those words do not limit any of other postures including turning upside down and lying on its side, where the linear motion guide unit has been practiced.

Figure 5:
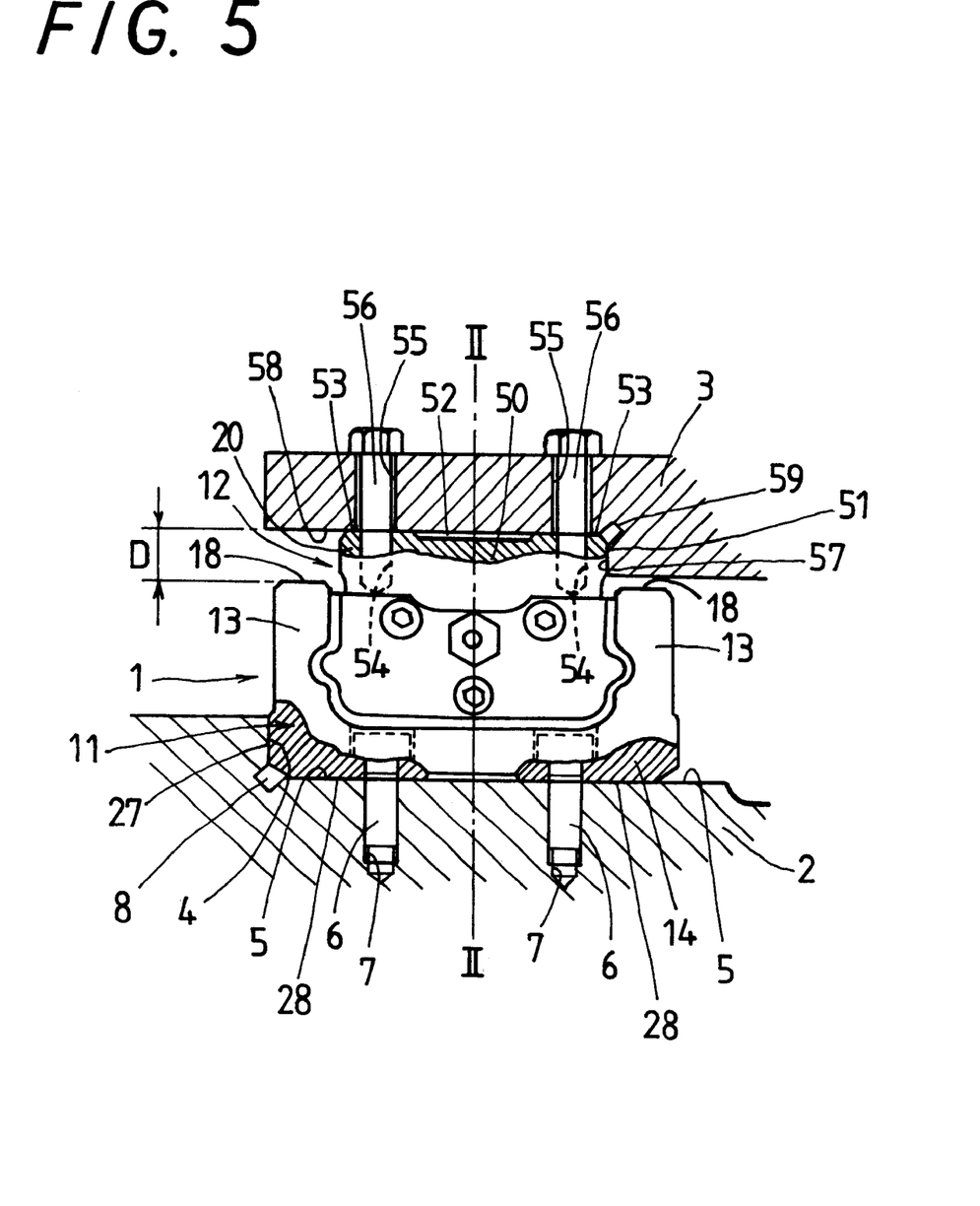
FIG. 5 is a front elevation, partially in section and partially broken away, of the linear motion guide unit shown in FIGS. 1 to 4, which is illustrated in a situation where it has been mounted to the bed and worktable.

A linear motion guide unit 1 in FIGS. 1 to 4 is intended to be used between a bed 3 and a table 2, referred to FIG. 5, which are movable relative to each other. The linear motion guide unit 1 is principally comprised of an elongated track rail 11 and a slider 12 accommodated in the track rail 11 for sliding movement along the track rail 11. The track rail 11 and the slider 12 are mounted to the bed 2 and the table 3, respectively, by fixing means such as bolts or screws, so that the table 2 is allowed to move relative to the bed 3 as the slider 12 moves along the track rail 11. Although but only one slider 12 is shown in the track rail 11 in the illustrative embodiment of FIGS. 1 to 4, it will be appreciated that any number of sliders 12 may be arranged for the track rail 11.

Figure 1:
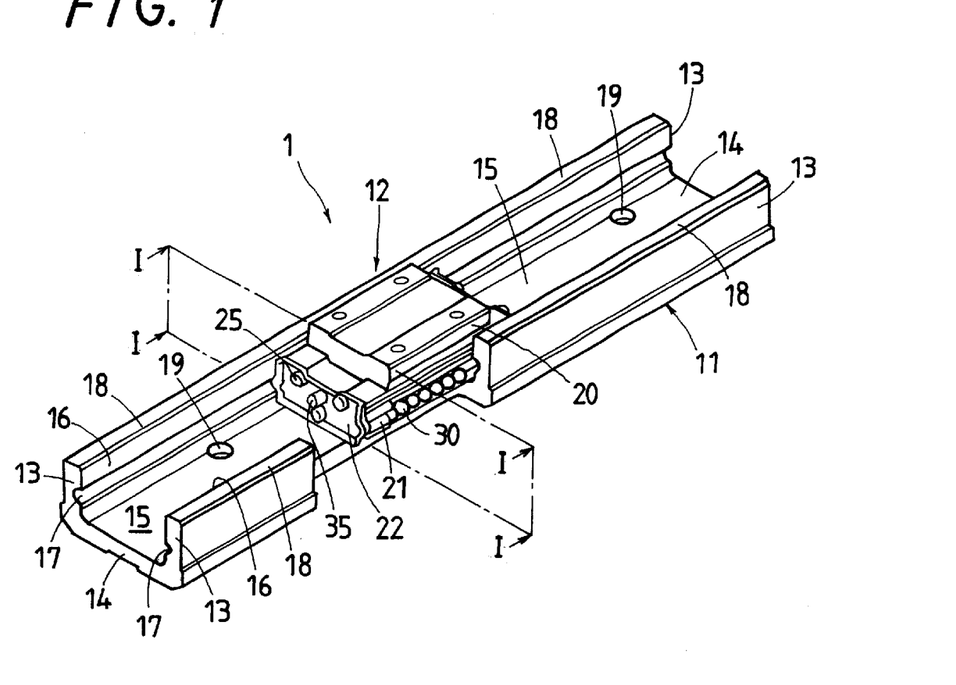
FIG. 1 is a perspective view, partially broken away, showing a preferred embodiment of a linear motion guide unit in accordance with the present invention.
Figure 2:
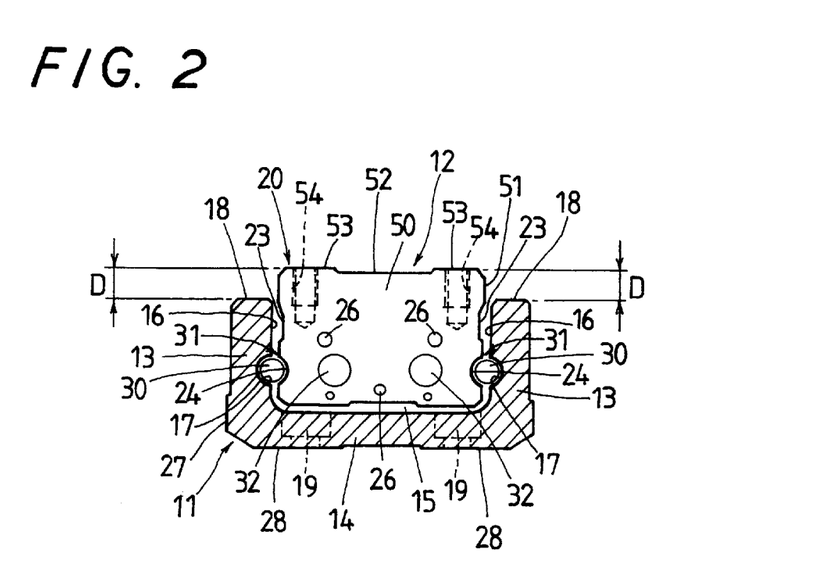
FIG. 2 is a cross-sectional view of the linear motion guide unit shown in FIG. 1 taken along the plane I—I.
Figure 3:
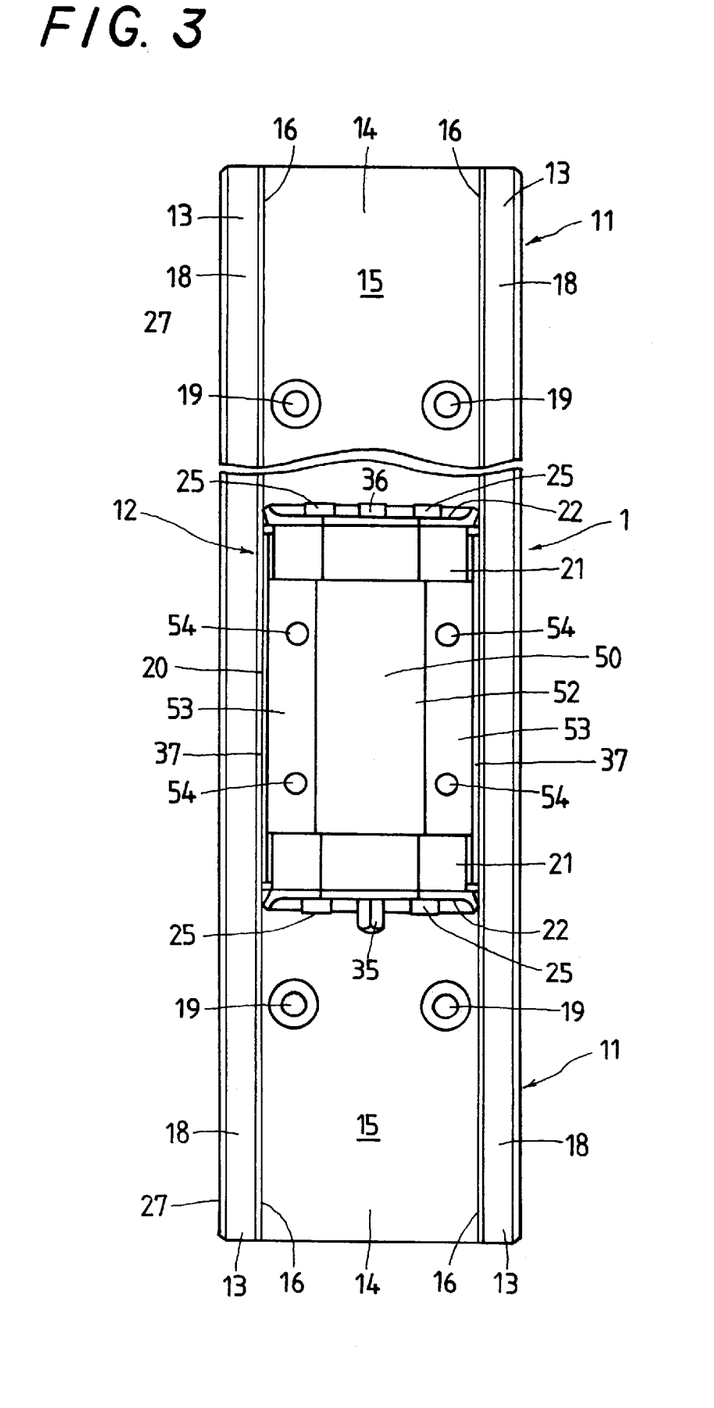
FIG. 3 is a top plan view of the linear motion guide unit shown in FIG. 1.
Figure 4:
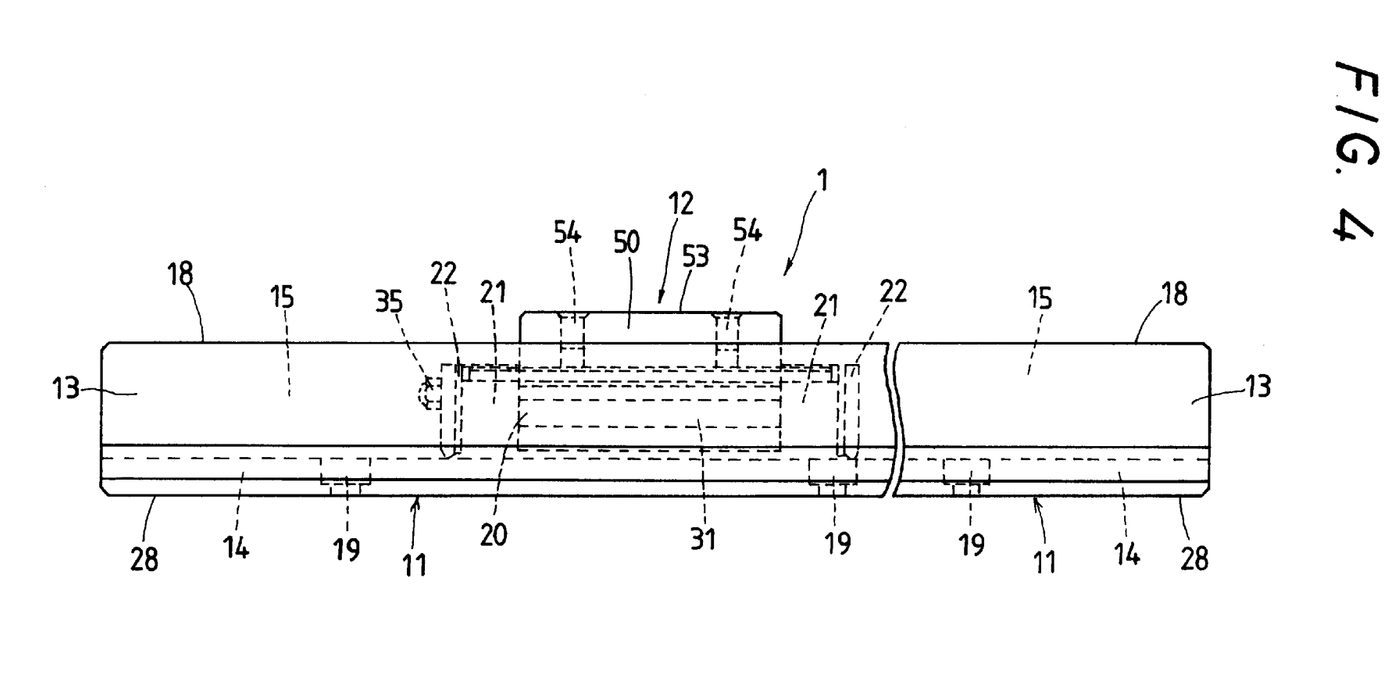
FIG. 4 is a side elevation of the linear motion guide unit shown in FIG. 1.

The elongated track rail 11 is formed to have a recess 15 of U-shape in cross-section, which is defined by a pair of widthwise opposing side walls 13 and a bottom 14 connecting the side walls 13 with one another. Thus, provided between the opposing side walls 13, that is, in the recess 15 is a guiding way along which the slider is allowed to move in a relatively sliding manner under favor of linear motion rolling guide mechanisms arranged between the slider 12 and the track rail 11, which will be described in detail hereinafter. The side walls 13 of the track rail 11 are made on inside surfaces 16 thereof with first raceway grooves 17, which are opened opposite to each other and extended lengthwise along the track rail 11. The first raceway grooves 17 are to provide raceways through which rolling elements of the linear motion rolling guide unit are allowed to run.

Compared with usual track rails such as solid rods, the track rail 11, as made in the U-shape in cross section, has so large secondary moment in cross section as to enhance remarkably the stiffness resisting against bending and twisting, which will be caused owing to the movement of the slider 12. This results in making it possible to employ any supporting construction of either cantilever mode where the track rail 11 is supported at only one lengthwise end thereof or bridge mode where the track rail 11 is supported at both lengthwise opposing ends thereof, besides most common supporting construction in which the track rail 11 is supported throughout the bottom thereof. Moreover, this type of the track rail 11 may be used as any structural member of the machinery or apparatus in which the linear motion guide unit is applied. The track rail 11 is made reduced as low as possible in height to render compact the linear motion guide unit. In addition, the track rail 11, although not shown, may be mounted directly with peripheral devices such as a drive mechanism for the linear motion guide unit.

The slider 12 is comprised of a casing 20 mostly accommodated in the recess 15 of the track rail 11, end caps 21 arranged on the lengthwise opposing ends of the casing 20, each to each end, and end seals 22 attached on the end caps 21, each to each cap, to seal clearances between the track rail 11 and the end caps 21. The end caps 21 and end seals 22 are tightened to the casing 20 by means of machine screws 25, which are screwed into matching holes bored in the casing 20. Formed on widthwise opposing side surfaces 23 of the casing 20 are second raceway grooves 24, each of which confronts the associated one of the first raceway grooves 17 formed on the inside surfaces 16 of the track rail 11, providing a raceway 31 through which rolling elements or balls 31 are allowed to run whereby the slider 12 may move smoothly along the track rail 11.

The casing 20 for the slider 12 is made in the form of a substantially rectangular parallelepiped having a width that may be nested snugly in the track rail 11. The casing 20 is made as reduced as possible in height likewise with the track rail 11. Especially, it is to be noted that a slider head 50 on the casing 20 is normally permitted to protrude by a height D of about 5 mm, at most equal and less than 10 mm above the top faces 18 of the side walls 13 of the track rail 11. Thus, the casing 20 has to be constructed such that the height D above the top faces 18 of the track rail 11 is made as small as possible. The linear motion guide unit 1 made compact in construction by the slider 12 combined with the track rail 11 demonstrates the possibility of incorporating more flexibility in design of peripheral equipment such as drive means of the ball-screw drive or motor for moving the slider 12 along the track rail 11, thus making it possible to render miniature in structure and light in weight the machinery or apparatus to which the linear motion guide unit 1 is applied.

Figure 6:
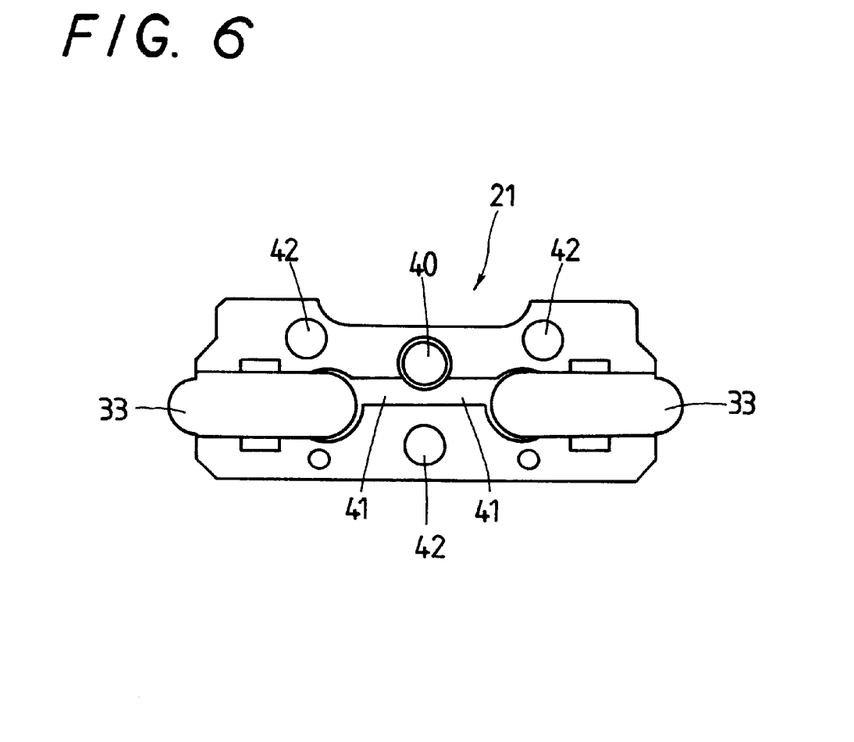
FIG. 6 is a rear elevation of an end cap to be used in the linear motion guide unit shown in FIG. 1.

Rolling elements, or balls 30, are incorporated in the linear motion guide unit 1 in such a manner as to run through endless circulating paths, which are composed of load areas of raceways 31 defined between the confronting raceway grooves 17, 24 and non-loaded areas of return tunnels 32 bored in the casing 20 and turnarounds 33, refer to FIG. 6, formed in the end caps 21 to allow the balls 30 to return to the load areas. It will be thus understood that the endless circulating paths including the raceways 31, in combination with the balls 30, provide linear motion guiding mechanisms to allow the slider 12 to move in sliding manner along the track rail 11. The balls 30 running in a row on each of the widthwise opposing side surfaces of the slider 12 are of balls comparatively large in diameter, and come in contact at their vertically opposing points with the raceway grooves 17 in the track rail 11 when observed on microscopic scales. Thus, the slider 12 is kept in contact with the track rail 11 at four linear areas so that the linear motion guide unit 1 may ensure steady high accuracy and rigidity even in applications plagued with complex loads and loads variable in magnitude and direction.

The slider 12 has a grease nipple 35 for applying lubricant to the endless circulating paths, which is attached to any one of the end caps 21 so as to extend outside from the associated end seal 22. A plug 36 is attached to the other end cap 21 to keep lubricant from leakage. Arranged on the raceways 31 are upper seals, not shown, to cover clearances between the casing 12 and the track rail 11 for protecting the raceways 31 against foreign matter such as dust and dirt.

The end caps 21 are, as shown in FIG. 6, attached to the lengthwise opposing ends of the casing 20 and made therein with the turnarounds 33, which are formed in grooves opened facing the casing 20 to allow the balls 30 to turn round smoothly from the raceways 31 to the return tunnels 32 and vice versa. The end caps 21 are provided therein with ports 40 to be connected to the grease nipple 35, and lubricant paths 41 opened to the ports 40 to allow the lubricant to flow into the turnarounds 33. The end caps 21 are moreover made at preselected locations thereof with threaded holes 42 in which machine screws 25 fit to mount the end caps 20 together with the end seals 22 to the casing 20.

Figure 7:
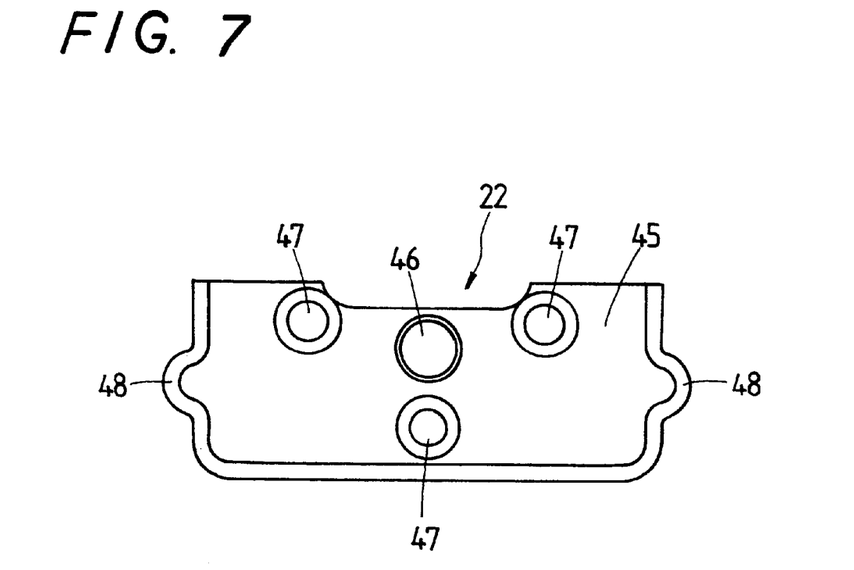
FIG. 7 is a front elevation of an end seal to be used in the linear motion guide unit shown in FIG. 1.

Referring to FIG. 7, each end seal 22 is comprised of a major body 45 and a lip 48 raised integrally from the periphery of the major body 45. The major body 45 of the end seal 22 is made with a port 46 to accommodate the grease nipple 35 and holes 47 matching with the machine screws, which are arranged in alignment with the port 40 and threaded holes 42 in the end caps 21, respectively. The lip 48 is formed to cover the lengthwise opposing ends of the raceways 31 and come in snug fit with the first raceway grooves 17 in the track rail 11.

The linear motion guide unit 1 of the present invention will be mounted to the bed 2 and table 3 according to the construction described hereinafter with referring to FIG. 5.

Provided on any one of the widthwise opposing side walls 13 of the track rail 11 is a reference side surface 27 for mounting, which extends lengthwise along the track rail 11. In contrast, the bed 2 is made with a mounting side surface 4 in correspondence with the reference side surface 27 for mounting. Both of the reference side surface 27 and the mounting side surface 4 extend lengthwise along the track rail 11 in parallel with each other and provide straight surfaces, which may come in abutment against one another. Abutment of the reference side surface 27 against the mounting side surface 4 defines the track rail 11 in its sidewise location and posture.

The bottom 14 interconnecting the widthwise opposing side walls 13 of the track rail 11 has a lower surface providing a reference bottom surface 28 for mounting, which serves a reference to mount the track rail 11 on the bed 2. The reference side surface 27 and the reference bottom surface 28 for mounting are formed in straight surfaces that are normal to each other. The bed 2 is made with a mounting top surface 5 in correspondence with the reference bottom surface 28 for mounting. The mounting side surface 4 and the mounting bottom surface 5 are arranged in perpendicular to each other to provide a stepped surface, at crossing area of which is formed a relief channel 8 for machining processes. Abutment of the reference bottom surface 28 against the mounting top surface 5 defines the track rail 11 in its vertical location and posture. The bottom 14 of the track rail 11 is made with holes 19 arranged in two rows and spaced away along the length of the track rail 11. The track rail 11 is determined in its not only sidewise but also vertical location and posture by abutting the reference side and bottom surfaces 27, 28 against the mounting side and top surfaces 4, 5, respectively, where the track rail 11 is then fixed on the bed 2 by the bolts 6 screwed into threaded holes 7, which are bored in the bed 2, through the matching holes 19.

The casing 20 of the slider 12 has the slider head 50 that protrudes above the top faces 18 of the widthwise opposing side walls 13 by the vertical distance D. Any one of the widthwise opposing side surfaces of the slider head 50 is finished with accuracy, providing a reference side surface 51 for mounting. As an alternative, the slider head 50 may be finished at both the widthwise opposing side surfaces to provide reference side surfaces 51, only either surface of which is used for mounting of the slider 12. The reference surface 51 for mounting provides a straight surface parallel with the direction along which the slider 12 moves. A top surface 52 of the slider head 50 provides partially a reference top surface 53 for mounting, where are opened four threaded holes 54 extending in parallel with a center line II—II. Fixing bolts 56 are screwed into the threaded holes 54. The reference surfaces 51 and 53 for mounting provide straight surfaces arranged normal to each other. On the other hand, the table 3 is also made with four matching holes 55 per one slider 12 in alignment with the threaded holes 54. The bolts 56 are screwed into the threaded holes 64 in the slider 12 through the matching holes 55 in the table 3 to mount the slider 12 to the table 3.

The table 3 is provided with a mounting side surface 57 and a mounting lower surface 58, which are arranged in perpendicular to each other to provide a stepped surface, at crossing area of which is formed a relief channel 59 for machining processes. Upon mounting the slider 12 to the table 3, the reference side surface 51 for mounting of the slider 12 is brought into abutment against the mounting side surface 57 of the table 3 while the reference top surface 53 for mounting comes into abutment against the mounting lower surface 58 of the table 3. The reference side surface 51 for mounting has a depth not more than the distance D, that is, in the range of from 5 mm to 10 mm, and a rigidity throughout its substantially entire surface area, which is enough to withstand against the abutment of the mounting side surface 57 of the slider head 50, thereby locating the slider 12 sidewise and keeping its posture. After the abutment of the reference side surface 51 against the mounting side surface 57 has located the slider 12 sidewise while the slider 12 has been also restrained vertically by abutting its reference top surface 53 against mounting lower surface 48, the bolts 56 fix the slider 12 to the table 3. As the reference side surface 51 for mounting of the slider 12 is provided in parallel with the reference side surface 27 for mounting of the track rail 11, the table 3 may be mounted accurately along the reference side surface on the track rail 11.

The reference side surface 27 for mounting of the track rail 27 is opposite widthwise of the track rail 11 to the reference side surface 51 for mounting of the slider 12. That is, the mounting side surface 57 is opposed sidewise to the mounting side surface 4. Thus, since the forces exerted on the mounting side surfaces 4 and 57 are compensated each other in the linear motion guide unit 1, a moment will be reduced, which might otherwise tilt the linear motion guide unit 1. This is especially advantageous to the linear motion guide unit 1 lying on its side, where it is turned through 90° from the posture shown in FIG. 5.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds are therefore intended to embraced by the claims.

What is claimed is:

1. A linear motion guide unit, comprising a track rail to be mounted to a bed and having a pair of lengthwise side walls connected to each other, and a slider to be mounted to a table movable relatively to the bed so as to move lengthwise along the track rail in a guiding way defined between the side walls of the track rail, wherein the slider has a slider head not more than the guiding way in width and protruding above top faces of the side walls, the track rail is provided with a first reference surface for mounting, against which a mounting surface formed on the bed comes in abutment, and the slider head is provided with a second reference surface for mounting, against which a mounting surface formed on the table comes in abutment.

2. A linear motion guide unit constructed as defined in claim 1 wherein the first reference surface for mounting is composed of a reference side surface formed on at least any one of the side walls of the track rail so as to extend in parallel with a lengthwise direction of the track rail, and a reference bottom surface formed on a bottom of the track rail so as to extend in parallel with the lengthwise direction of the track rail.

3. A linear motion guide unit constructed as defined in claim 2 wherein the mounting surface formed on the bed is composed of a mounting side surface and a mounting top surface, and the track rail is located with respect to the bed, with the reference side surface and the reference bottom surface being brought into abutment against the mounting side surface and the mounting top surface, respectively.

4. A linear motion guide unit constructed as defined in claim 1 wherein the track rail has a bottom interconnecting the widthwise opposing side walls with each other to define a recess of U-shape in cross section of the track rail, thereby providing the guiding way along which the slider moves in a sliding manner.

5. A linear motion guide unit constructed as defined in claim 4 wherein the bottom of the track rail is made with holes in which fixing bolts fit to mount the track rail to the bed.

6. A linear motion guide unit constructed as defined in claim 1 wherein the second reference surface for mounting is composed of a reference side surface formed on at least any one of the sidewise opposing side surfaces of the slider so as to extend in parallel with a moving direction of the slider, and a reference top surface formed on a top surface of the slider so as extend in parallel with the moving direction of the slider.

7. A linear motion guide unit constructed as defined in claim 6 wherein the mounting surface formed on the table is composed of a mounting side surface and a mounting lower surface, and the slider is located with respect to the table, with the reference side surface and the reference top surface being brought into abutment against the mounting side surface and the mounting lower surface, respectively.

8. A linear motion guide unit constructed as defined in claim 6 wherein the slider head is made with threaded holes into which fixing bolts are screwed through the table to mount the slider to the table.

9. A linear motion guide unit constructed as defined in claim 6 wherein the reference side surface provided on the track rail and the reference side surface provided on the slider are arranged in parallel with each other and in sidewise opposition to each other with respect to the slider.

10. A linear motion guide unit constructed as defined in claim 1 wherein the slider head protrudes above top faces of the widthwise opposing side walls of the track rail by an amount of distance in a range of from 5 mm to 10 mm.

11. A linear motion guide unit constructed as defined in claim 1 wherein the slider is movable in a sliding manner along the track rail through rolling elements, which run through raceways defined between first and second raceway grooves confronting one another, the first raceway grooves being formed on widthwise opposing inside surfaces of the side walls of the track rail, and the second raceway grooves being formed on the slider in confrontation with the first raceway grooves.

12. A linear motion guide unit constructed as defined in claim 11 wherein the slider is comprised of a casing made with the second raceway grooves, end caps arranged on lengthwise opposing ends of the casing, each to each end, and end seals arranged on the end caps.

* * * * *